(12) United States Patent
Duckworth et al.

(10) Patent No.: US 12,100,074 B2
(45) Date of Patent: *Sep. 24, 2024

(54) VIEW SYNTHESIS ROBUST TO UNCONSTRAINED IMAGE DATA

(71) Applicant: Google LLC, Mountain View, CA (US)

(72) Inventors: Daniel Christopher Duckworth, Berlin (DE); Alexey Dosovitskiy, Berlin (DE); Ricardo Martin-Brualla, Seattle, WA (US); Jonathan Tilton Barron, Alameda, CA (US); Noha Radwan, Berlin (DE); Seyed Mohammad Mehdi Sajjadi, Berlin (DE)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,609

(22) Filed: Jun. 1, 2023

(65) Prior Publication Data

US 2023/0306655 A1   Sep. 28, 2023

Related U.S. Application Data

(63) Continuation of application No. 17/722,969, filed on Apr. 18, 2022, now Pat. No. 11,704,844, which is a
(Continued)

(51) Int. Cl.
*G06T 11/00* (2006.01)
*G06T 7/90* (2017.01)

(52) U.S. Cl.
CPC .............. *G06T 11/001* (2013.01); *G06T 7/90* (2017.01); *G06T 2207/20081* (2013.01)

(58) Field of Classification Search
CPC ......... G06T 11/00; G06T 11/001; G06T 5/50; G06T 7/90; G06T 2207/20081; G06T 2207/20212–20224
See application file for complete search history.

(56) References Cited

U.S. PATENT DOCUMENTS 11,308,659 B2 * 4/2022 Duckworth ............... G06T 7/90
2019/0045168 A1 * 2/2019 Chaudhuri ............ G06T 3/4053
(Continued)

OTHER PUBLICATIONS

Agarwal, "Building Rome in a Day.", Communications of the Association for Computing Machinery, vol. 54, Issue 10, 2011, pp. 105-112.
(Continued)

*Primary Examiner* — Sean T Motsinger
(74) *Attorney, Agent, or Firm* — DORITY & MANNING P.A.

(57) ABSTRACT

Provided are systems and methods for synthesizing novel views of complex scenes (e.g., outdoor scenes). In some implementations, the systems and methods can include or use machine-learned models that are capable of learning from unstructured and/or unconstrained collections of imagery such as, for example, "in the wild" photographs. In particular, example implementations of the present disclosure can learn a volumetric scene density and radiance represented by a machine-learned model such as one or more multilayer perceptrons (MLPs).

20 Claims, 7 Drawing Sheets

Related U.S. Application Data continuation of application No. 17/390,263, filed on Jul. 30, 2021, now Pat. No. 11,308,659.

(60) Provisional application No. 63/059,322, filed on Jul. 31, 2020.

(56) References Cited

U.S. PATENT DOCUMENTS

| | | | | |
|---|---|---|---|---|
| 2019/0066733 | A1* | 2/2019 | Somanath | G06T 3/4046 |
| 2020/0273188 | A1* | 8/2020 | Hamilton | G06T 15/06 |
| 2020/0334894 | A1* | 10/2020 | Long | G06T 13/00 |
| 2020/0380720 | A1* | 12/2020 | Dixit | G06T 7/50 |
| 2021/0004969 | A1* | 1/2021 | Pourian | G06T 7/223 |
| 2021/0390761 | A1* | 12/2021 | Kowalski | G06T 15/205 |
| 2023/0215085 | A1* | 7/2023 | Olszewski | G06T 15/06 |
| | | | | 345/426 |

OTHER PUBLICATIONS

Aliev, "Neural Point-Based Graphics.", arXiv:1906.08240v3, Jun. 19, 2019, 16 pages.
Bojanowski, "Optimizing the Latent Space of Generative Networks.", Thirty-fifth International Conference on Machine Learning, Jul. 10-15, Stockholm, Sweden, pp. 600-609.
Brooks, "Unprocessing Images for Learned Raw Denoising.", Institute of Electrical and Electronics Engineers/CVF Conference on Computer Vision and Pattern Recognition, Jun. 16-20, 2019, Long Beach, California, United States, pp. 11028-11037.
Buehler, "Unstructured Lumigraph Rendering.", Twenty-eighth Conference on Computer Graphics and Interactive Techniques, Aug. 12-17, 2001, Los Angeles, California, United States, pp. 425-432.
Chen, "Rethinking Atrous Convolution for Semantic Image Segmentation.", arXiv:1706.05587v3, Jun. 17, 2017, 14 pages.
Flynn, "DeepStereo: Learning to Predict New Views from the World's Imagery.", Institute of Electrical and Electronics Engineers Conference on Computer Vision and Pattern Recognition, Jun. 27-30, 2016, Las Vegas, Nevada, United States, pp. 5515-5524.
Flynn, "Deep View: View Synthesis with Learned Gradient Descent.", Institute of Electrical and Electronics Engineers/CVF Conference on Computer Vision and Pattern Recognition, Jun. 16-20, 2019, Long Beach, California, United States, pp. 2362-2371.
Frahm, "Building Rome on a Cloudless Day.", Eleventh European Conference on Computer Vision, Sep. 5-11, 2010, Crete, Greece, pp. 368-381.
Hartley, "Multiple View Geometry in Computer Vision.", Cambridge University Press, New York, 2003, 673 pages.
International Preliminary Report on Patentability for Application No. PCT/US2021/043680, mailed Feb. 9, 2023, 11 pages.
International Search Report and Written Opinion for Application No. PCT/US2021/043680, mailed Nov. 22, 2022, 14 pages.
Isola, "Image-to-Image Translation with Conditional Adversarial Networks", Institute of Electrical and Electronics Engineers Conference on Computer Vision and Pattern Recognition, Jul. 21-26, 2017, Honolulu, Hawaii, United States, pp. 5967-5976.
Jin, "Image Matching Across Wide Baselines: From Paper to Practice", arXiv:2003.01587vS, Mar. 3, 2020, 27 pages.
Johnson, "Perceptual Losses for Real-Time Style Transfer and Super-Resolution.", Fourteenth European Conference on Computer Vision, Oct. 8-16, 2016, Amsterdam, The Netherlands, pp. 694-711.
Kendall, "What Uncertainties Do WE Need in Bayesian Deep Learning for Computer Vision?", Thirty-first Conference on Neural Information Processing Systems, Dec. 4-9, 2017, Long Beach, California, United States, pp. 5580-5590.
Kingma, "Adam: A Method for Stochastic Optimization.", Third International Conference on Learning Representations, May 7-9, 2015, San Diego, California, United States, 15 pages.
Lafont, "Coherent Intrinsic Images from Photo Collections.", Association for Computing Machinery Transactions on Graphics, vol. 31, Issue 6, Nov. 2012, pp. 1-10.
Levoy, "Light Field Rendering.", Twenty-third International Conference on Computer Graphics and Interactive Techniques, Aug. 4-9, 1996, New Orleans, Louisiana, United States, pp. 32-42.
Li, "Crowdsampling the Plenoptic Function.", Sixteenth European Conference on Computer Vision, Aug. 23-28, 2020, Online Conference, 18 pages.
Lombardi, "Neural Volumes: Learning Dynamic Renderable Volumes from Images.", Association for Computing Machinery Transactions on Graphics, vol. 28, No. 4, Jul. 2019, pp. 1-14.
Martin-Brualla, "LookinGood: Enhancing Performance Capture with Real-time Neural Re-Rendering.", Association for Computing Machinery Transactions on Graphics, vol. 37, Issue 6, Nov. 2018, pp. 1-14.
Martin-Brualla, "NeRF in the Wild: Neural Radiance Fields for Unconstrained Photo Collections.", arXiv:2008.02268v3, Jan. 6, 2021, 15 pages.
Max, "Optical Models for Direct Volume Rendering.", Institute of Electrical and Electronics Engineers Transactions on Visualization and Computer Graphics, vol. 1, Issue 2, Jun. 1995, pp. 99-108.
Meshry et al., "Neural Rerendering in the Wild.", Institute of Electrical and Electronics Engineers/CVF Conference on Computer Vision and Pattern Recognition (CVPR), 2019, pp. 6878-6887.
Mildenhall et al., "NERF: Representing Scenes as Neural Radiance Fields for View Synthesis." arXiv:2003.08934v1, dated Mar. 19, 2020, 21 pages.
Mildenhall, "Local Light Field Fusion: Practical View Synthesis with Prescriptive Sampling Guidelines.", Association for Computing Machinery Transactions on Graphics, vol. 38, Issue 4, Jul. 2019, pp. 1-14.
Pappas, "Perceptual Criteria for Image Quality Evaluation.", Handbook of Image and Video Processing, Academic Press, 2000, 974 pages.
Price, "Augmenting Crowd-Sourced 3D Reconstructions using Semantic Detections.", Institute of Electrical and Electronics Engineers/CVF Conference on Computer Vision and Pattern Recognition, Jun. 18-23, 2018, Salt Lake City, Utah, United States, pp. 1926-1935.
Schonberger, "Structure-from-Motion Revisited.", Institute of Electrical and Electronics Engineers Conference on Computer Vision and Pattern Recognition, Jun. 27-30, 2016, Las Vegas, Nevada, United States, pp. 4104-4113.
Shan, "The Visual Turing Test for Scene Reconstruction.", International Conference on 3D Vision, Jun. 29-Jul. 1, 2013, Seattle, Washington, United States, pp. 25-32.
Shum, Image Based Rendering., Springer Scientific+Business Media LLC, New York, New York, United States, 2007, 425 pages.
Sitzmann, "Deep Voxels: Learning Persistent 3D Feature Embeddings.", Institute of Electrical and Electronics Engineers/CVF Conference on Computer Vision and Pattern Recognition, Jun. 16-20, 2019, Long Beach, California, United States, pp. 2437-2446.
Sitzmann, "Scene Representation Networks: Continuous 3D-Structure-Aware Neural Scene Representations.", Thirty-third Conference on Neural Information Processing Systems, Dec. 8-14, 2019, Vancouver, Canada, pp. 1121-1132.
Snavely, "Photo Tourism: Exploring Photo Collections in 3D.", Special Interest Group on Computer Graphics and Interactive Techniques Conference, Jul. 30-Aug. 3, 2006, Boston, Massachusetts, United States, pp. 835-846.
Talebi, "NIMA: Neural Image Assessment.", Institute of Electrical and Electronics Engineers Transactions on Image Processing, vol. 27, No. 8, Aug. 2018, pp. 3998-4011.
Tancik, "Fourier Features Let Networks Learn High Frequency Functions in Low Dimensional Domains.", Thirty-fourth Conference on Neural Information Processing Systems, Dec. 6-12, 2020, Virtual Conference, pp. 7537-7547.
Tewari, "State of the Art on Neural Rendering"., Computer Graphics Forum, vol. 40, Issue 6, Sep. 2021, pp. 1-27.
Thies, "Deferred Neural Rendering: Image Synthesis Using Neural Textures.", Association for Computing Machinery Transactions on Graphics, vol. 38, No. 4, Jul. 2019, pp. 1-12.
Thung, "A Survey of Image Quality Measures.", International Conference for Technical Postgraduates, Dec. 14-15, 2009, Kuala Lumpur, Malaysia, 4 pages.

(56) References Cited

OTHER PUBLICATIONS

Triggs, "Bundle Adjustment—A Modem Synthesis.", International Workshop on Vision Algorithms: Theory and Practice, Sep. 21-22, 1999, Kerkya, Greece, pp. 298-372.

Wang, "A Universal Image Quality Index.", Institute of Electrical and Electronics Engineers Signal Processing Letters, vol. 9, Issue 3, Mar. 2002, pp. 81-84.

Wang, "Multi-Scale Structural Similarity for Image Quality Assessment.", Thirty-seventh Asilomar Conference on Signals, Systems & Computers, Nov. 9-12, 2003, Pacific Grove, California, United States, pp. 1398-1402.

Zhang, "The Unreasonable Effectiveness of Deep Features as a Perceptual Metric.", 2018 Institute of Electrical and Electronics Engineers/CVF Conference on Computer Vision and Pattern Recognition, Jun. 18-23, 2018, Salt Lake City, Utah, United States, pp. 586-595.

Zhou, "Stereo Magnification: Learning View Synthesis Using Multiplane Images.", Association for Computing Machinery Transactions on Graphics, vol. 37, Issue 4, Aug. 2018, pp. 1-12.

\* cited by examiner

VIEW SYNTHESIS ROBUST TO UNCONSTRAINED IMAGE DATA

PRIORITY CLAIM

The present application is a continuation of U.S. application Ser. No. 17/722,969 having a filing date of Apr. 18, 2022, which is a continuation of U.S. application Ser. No. 17/390,263 having a filing date of Jul. 30, 2021, which claims priority to and the benefit of U.S. Provisional Patent Application No. 63/059,322, filed Jul. 31, 2020. Applicant claims priority to and the benefit of each of such applications and incorporates all such applications herein by reference in its entirety.

FIELD

The present disclosure relates generally to systems and methods for modeling a scene, in furtherance, for example, of performing view synthesis of the scene. More particularly, the present disclosure relates to machine learning models which provide improved robustness against ubiquitous, real world phenomena in uncontrolled images such as variable lighting and transient occluders.

BACKGROUND

The task of view synthesis aims to create new views of a specific environment (e.g., scene, object, or subject) starting from a number of pictures taken from given point of views. As an example, given a number of images of a specific subject, taken from specific points with specific camera settings and orientations, a view synthesis system attempts to generate a synthetic image as taken from a virtual camera placed in a different point and with given settings.

While some approaches to view synthesis leverage neural radiance fields to effectively learn a volumetric scene density and radiance from imagery captured in controlled environments, these approaches are incapable of modeling many ubiquitous, real world phenomena in uncontrolled images such as variable lighting and transient occluders.

SUMMARY

Aspects and advantages of embodiments of the present disclosure will be set forth in part in the following description, or can be learned from the description, or can be learned through practice of the embodiments.

One example aspect of the present disclosure is directed to a computing system to generate synthetic imagery of a scene. The computing system includes one or more processors; and one or more non-transitory computer-readable media that collectively store: a machine-learned view synthesis model that comprises a base portion, a static content portion that models static content within the scene, and a transient content portion that models transient content within the scene; and instructions that, when executed by the one or more processors, cause the computing system to perform operations. The operations include obtaining a position within three-dimensional space; processing data descriptive of the position with the base portion of the machine-learned view synthesis model to generate a static opacity and a latent representation; processing the latent representation with the static content portion of the machine-learned view synthesis model to generate a static color; processing the latent representation with the transient content portion of the machine-learned view synthesis model to generate a transient opacity and a transient color; and performing volumetric rendering to generate a synthetic pixel color for a synthetic pixel of a synthesized image from the static opacity, the static color, the transient opacity, and the transient color.

Another example aspect of the present disclosure is directed to a computer-implemented method for view synthesis with user-specifiable characteristics. The method includes obtaining, by a computing system comprising one or more computing devices, a desired position within three-dimensional space and a user-specified generative embedding, wherein the generative embedding encodes one or more visual characteristics of a synthetic image to be generated. The method includes processing, by the computing system, data descriptive of the position with a base portion of a machine-learned view synthesis model to generate an opacity and a latent representation. The method includes processing, by the computing system, the latent representation and the generative embedding with a content portion of the machine-learned view synthesis model to generate a color. The method includes performing, by the computing system, volumetric rendering to generate a synthetic pixel color for a synthetic pixel of the synthesized image from the opacity and the color, wherein the synthesized image exhibits the one or more visual characteristics encoded by the generative embedding.

Another example aspect of the present disclosure is directed to one or more non-transitory computer-readable media that collectively store instructions that, when executed by one or more processors, cause a computing system to perform operations. The operations include obtaining, by the computing system, a position within three-dimensional space and one or more camera parameters associated with an existing training image. The operations include processing, by the computing system, data descriptive of the position and the one or more camera parameters with a base portion of a machine-learned view synthesis model to generate an opacity and a latent representation. The operations include processing, by the computing system, the latent representation with a content portion of the machine-learned view synthesis model to generate a color. The operations include performing, by the computing system, volumetric rendering to generate a synthetic pixel color for a synthetic pixel of a synthesized image from the opacity and the color. The operations include evaluating a loss function that compares the synthetic pixel color with a ground truth pixel color for a training pixel including in the existing training image. The operations include modifying one or more values of the camera parameters based at least in part on the loss function.

Another example aspect of the present disclosure is directed to a computing system to generate synthetic imagery of a scene. The computing system includes one or more processors and one or more non-transitory computer-readable media that collectively store: a machine-learned view synthesis model that comprises a base portion and a static content portion that models static content within the scene, wherein the base portion and the static portion have been trained jointly with a transient content portion that models transient content within the scene; and instructions that, when executed by the one or more processors, cause the computing system to perform operations. The operations include: obtaining a position within three-dimensional space; processing data descriptive of the position with the base portion of the machine-learned view synthesis model to generate a static opacity and a latent representation; processing the latent representation with the static content portion of the machine-learned view synthesis model to generate a static color; and performing volumetric rendering to generate a synthetic pixel color for a synthetic pixel of a synthesized image from the static opacity and the static color.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
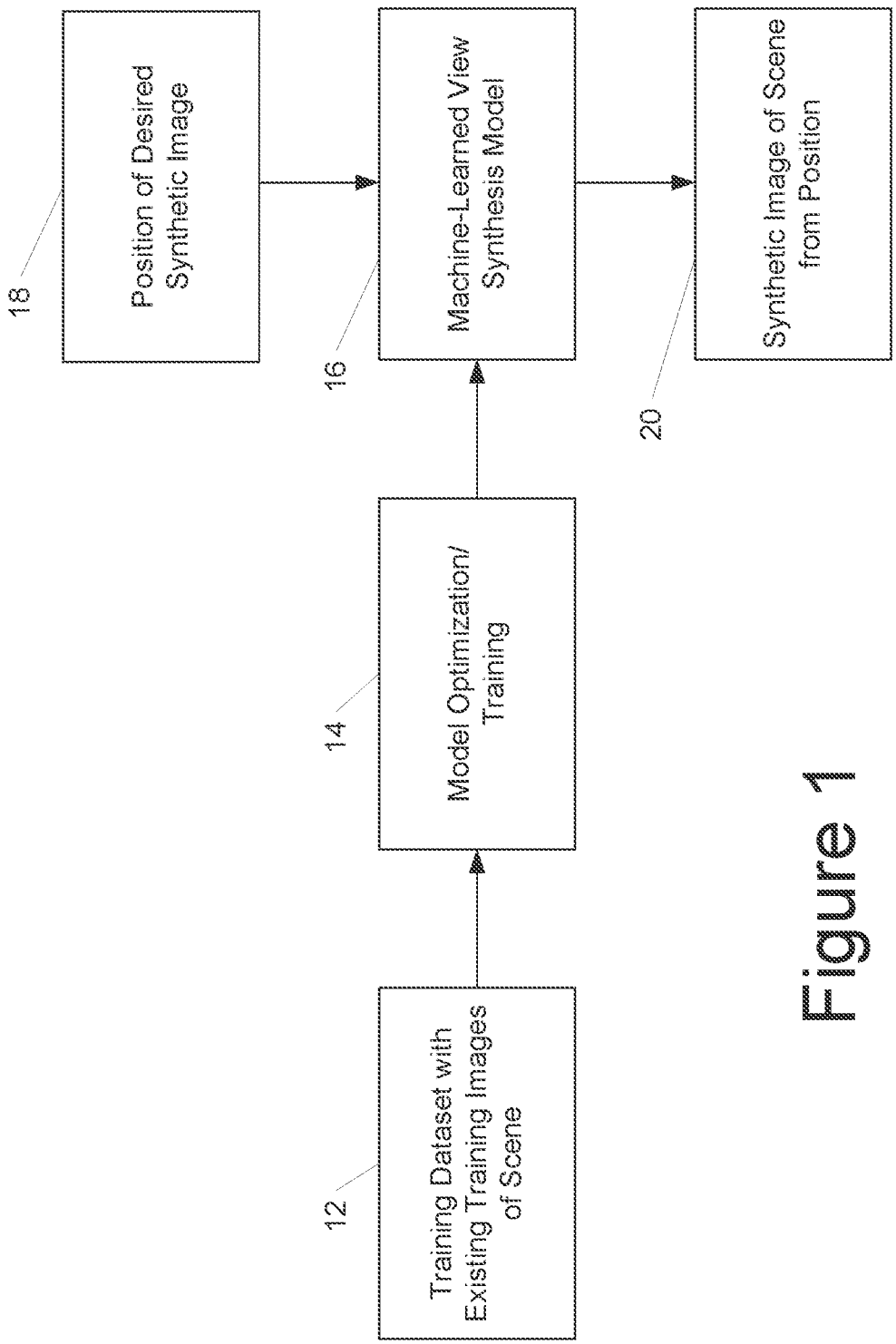
FIG. 1 depicts a block diagram of an example process for training a machine-learned view synthesis model and then using the machine-learned view synthesis model to perform view synthesis according to example embodiments of the present disclosure.

Reference numerals that are repeated across plural figures are intended to identify the same features in various implementations.

DETAILED DESCRIPTION

Overview

Generally, the present disclosure is directed to systems and methods for synthesizing novel views of complex scenes (e.g., outdoor scenes). In some implementations, the systems and methods can include or use machine-learned models that are capable of learning from unstructured and/or unconstrained collections of imagery such as, for example, "in the wild" photographs. In particular, example implementations of the present disclosure can learn a volumetric scene density and radiance represented by a machine-learned model such as one or more multilayer perceptrons (MLPs) or other neural networks or other machine-learned models.

More particularly, while certain techniques such as those described in NeRF: Representing Scenes as Neural Radiance Fields for View Synthesis by Mildenhall et al. (arXiv: 2003.08934v1) (hereinafter "NeRF") are effective with imagery captured in controlled environments, they are incapable of modeling many ubiquitous, real world phenomena in uncontrolled images such as variable lighting and transient occluders.

Specifically, NeRF is built on the assumption of 3-D consistency—it is assumed that two images taken of the same scene should be consistent with each other. However, in uncontrolled environments (e.g., "in the wild" photography), two images of the same scene often have inconsistencies, including inconsistencies in lighting characteristics or other visual characteristics and/or the presence/absence of transient content/items (e.g., each of two photos of a landmark may have a different set of transient tourists positioned in front the landmark).

NeRF learns a per-scene model described by a (learned) function. This function takes in a position (x, y, z) and view direction (theta, phi) and produces an RGB color and opacity (sigma). To generate a render, one traces a ray through each pixel in a camera, integrating the color, weighted by the accumulated opacity, along the length of the ray. The NeRF model is trained to minimize the squared error between the RGB values predicted and ground truth imagery. Thus, in order to train NeRF, one requires photos and camera parameters. The former says what color each pixel should be, the latter says where the ray emanating from that pixel lives in 3-D space.

The present disclosure provides a number of techniques which improve the NeRF model or similar models. These additions enable the proposed models to be more robust to messy, real-world photography.

In particular, according to one aspect of the present disclosure, during training of a machine-learned view synthesis model on a set of training images, each training image can be assigned a generative embedding. The generative embedding can serve to encode visual characteristics of the image such as lighting characteristics (e.g., white balance), content characteristics (e.g., time of day, weather, season of the year), stylistic characteristics (e.g., photo editing software settings), etc.

Thus, in some implementations, for each training image, a small generative embedding (e.g., a vector of 8-32 floats) can be assigned (e.g., indexed by image ID). Use of such generative embeddings enables the model to account for variations in individual images such as white balance and stylistic post-processing.

These generative embeddings can be learned/updated as part of the model. For example, the generative embeddings can be treated as model parameters and updated during model training (e.g., during or as a result of backpropagation of a loss function). Through such process, generative embeddings for images with similar characteristic(s) can be moved close to one another.

Next, during view synthesis, a desired generative embedding that encodes desired characteristics (e.g., desired lighting characteristics, content characteristics, stylistic characteristics, etc.) can be specified by the user and provided to the model. In response, the model can generate synthetic imagery with the desired characteristic(s) encoded by the desired generative embedding. In one example, the desired generative embedding can be obtained by interpolating two or more generative embeddings learned for two or more of the training images that have been selected by a user (e.g., because they exhibit/are representative of the desired characteristics).

Thus, the model can use the generative embeddings to account for differences in the image characteristics which do not reflect actual differences in the underlying scene. For example, differences in post-processing settings for images of a landmark do not actually reflect differences in the landmark itself. This allows the trained model to better handle inconsistencies among the training images, which results in the model being more robust to unconstrained sets of training imagery.

According to another example aspect, some implementations of the present disclosure incorporate uncertainty directly into the model's volumetric rendering pipeline. For example, in addition to static opacity and static color, the model can also predict an uncertainty value 'β' and a transient opacity and transient color. The transient data can be integrated, similar as is performed for the static data, to obtain a learned weight multiplier for each ray. Intuitively, this allows the model to deprioritize reconstructing "difficult" parts of an image that are inconsistent with other photos (e.g., which in many cases correspond to transient and inconsistent occluders within the imagery).

Thus, example implementations of the present disclosure have a novel model architecture which includes a base portion, a static content portion that models static content within a scene, and a transient content portion that models transient content within the scene. In some implementations, the loss function on which the model is trained can provide a reduced amount of loss for instances in which a difference between the predicted synthetic color and the ground truth color arises from the transient content modeled by the view synthesis model. Thus, the model has the ability to deviate from the ground truth imagery in cases where the ground truth imagery depicts transient content or is otherwise associated with high uncertainty. This allows the trained model to better handle inconsistencies among the training images, which results in the model being more robust to unconstrained sets of training imagery.

According to another example aspect, some implementations of the present disclosure can finetune each training image's camera parameters directly within the model itself. Example camera parameters include orientation, location, focal length, principal point, skew, radial distortion, tangential distortion, and/or various camera intrinsics. This allows the model to adjust camera parameters (e.g., within some threshold or tolerance) to perfectly match the scene being reconstructed and does not rely on sparse image features typically used in 3-D registration. Stated differently, by enabling the camera parameters for each training image to be modified, some amount of noise present within the training dataset can be removed from the dataset. This allows the trained model to better handle inconsistencies among the training images, which results in the model being more robust to unconstrained sets of training imagery.

The systems and methods of the present disclosure provide a number of technical effects and benefits. As one example, the systems and methods described herein enable a model to be more robust against uncontrolled imagery. This results in improved model performance when synthesizing views of a scene based on uncontrolled training datasets. Thus, the systems and methods of the present disclosure improve the realism, consistency, and user-controllability of a view synthesis system.

As another example technical effect and benefit, by providing the model with explicit mechanism(s) to account for and/or correct inconsistencies within the training dataset, the model will be able to converge to an optimized solution in a faster manner (e.g., with fewer training rounds and/or requiring fewer training images). Faster convergence can result in savings of computing resources such as reduced processor usage, memory usage, and/or bandwidth usage.

Thus, the present disclosure provides systems and methods which resolve the issues associated with unconstrained imagery and/or provide additional user controllability. Example experimental data contained in U.S. Provisional Patent Application No. 63/059,322 demonstrates, via comprehensive synthetic and real-world experiments, the effectiveness of the proposed techniques. The example experiments apply example implementations of the systems described herein to multiple landmarks, using both high resolution captures and internet photos, resulting in photorealistic reconstructions and significantly outperforming prior work.

Although example implementations of the present disclosure are described with reference to single frames of imagery, the systems and methods of the present disclosure can equally be applied to videos or other multi-frame datasets. For example, a video can be synthesized which shows a "fly-over" of the modeled scene. The frames of the video can be temporally and stylistically consistent (e.g., through consistent use of the same desired generative embedding for all synthesized frames of the video).

In addition, synthesized frames of imagery can be the same or different resolution as the training images on which the model is trained. For example, a model can be trained on low-resolution images and then used to generate high-resolution synthetic images.

The color data used and/and generated by the systems and methods of the present disclosure (e.g., the input data colors, static colors, transient colors, synthetic colors, etc.) can be represented in any color space, including, as examples, RGB spaces (e.g., RGB, RGBA), CIE spaces, HSV and HSL spaces, CMYK spaces, grayscale, and/or other color spaces.

With reference now to the Figures, example embodiments of the present disclosure will be discussed in further detail.

Example Techniques

This section describes example implementations of the proposed approaches, which may, in some implementations, be referred to as NeRF-W. The described models are well-designed for reconstructing 3-D scenes from "in-the-wild" photo collections and advance upon the NeRF model described by Mildenhall et al.

At its core, NeRF relies on multiview consistency: every point in 3-D space should appear the same in all (unobstructed) views. This condition is relaxed with dependence on view direction, but significant variations in color are not something NeRF is capable of capturing. In particular, NeRF typically handles variations in color by associating these variations with the viewing angle. As such, while a single image may appear normal, validation views or sets of multiple images from different viewing angles (e.g., a fly-through video) will be inconsistent.

When photos are captured in a controlled setting by a single person, NeRF's assumptions are met and photorealistic reconstructions are achievable. However, unconstrained photo collections, such as amateur photos of famous landmarks, present a host of challenges NeRF is unable to account for.

As one example, unconstrained images may depict the same scene but with different weather. Photos are taken at different times under variable lighting conditions. In outdoor photography, time of day and weather directly impact the color of all objects in the scene. Further, the sky itself varies with time.

As another example, unconstrained images may depict the same scene but with different post-processing: Photo post-processing, including adjustments to exposure and white balance, are entirely unconstrained and further impact the color of all objects in the scene.

As yet another example, unconstrained images may depict the same scene but with different transient objects: As photos were not captured at a single point in time, transient objects including people, banners, and foliage vary from image to image.

In the descriptions that follow (and also in the overview above), the present disclosure proposes a number of enhancements directly designed to tackle these phenomena.

FIG. 1 depicts a block diagram of an example process for training a machine-learned view synthesis model and then using the machine-learned view synthesis model to perform view synthesis according to example embodiments of the present disclosure.

Referring to FIG. 1, a training dataset 12 can include existing training images that depict a scene. As described herein, the training images may be unconstrained and may exhibit various inconsistencies with each other. As shown at 14, a computing system can perform a model optimization or training process on the training dataset 12 to generate a machine-learned view synthesis model 16 (see, e.g., FIG. 2). After training, a position of a desired synthetic image 18 can be provided to the model 16. In response, the model 16 can generate a synthetic image 20 that depicts the scene from the position 18 (see, e.g., FIG. 3).

Figure 2:
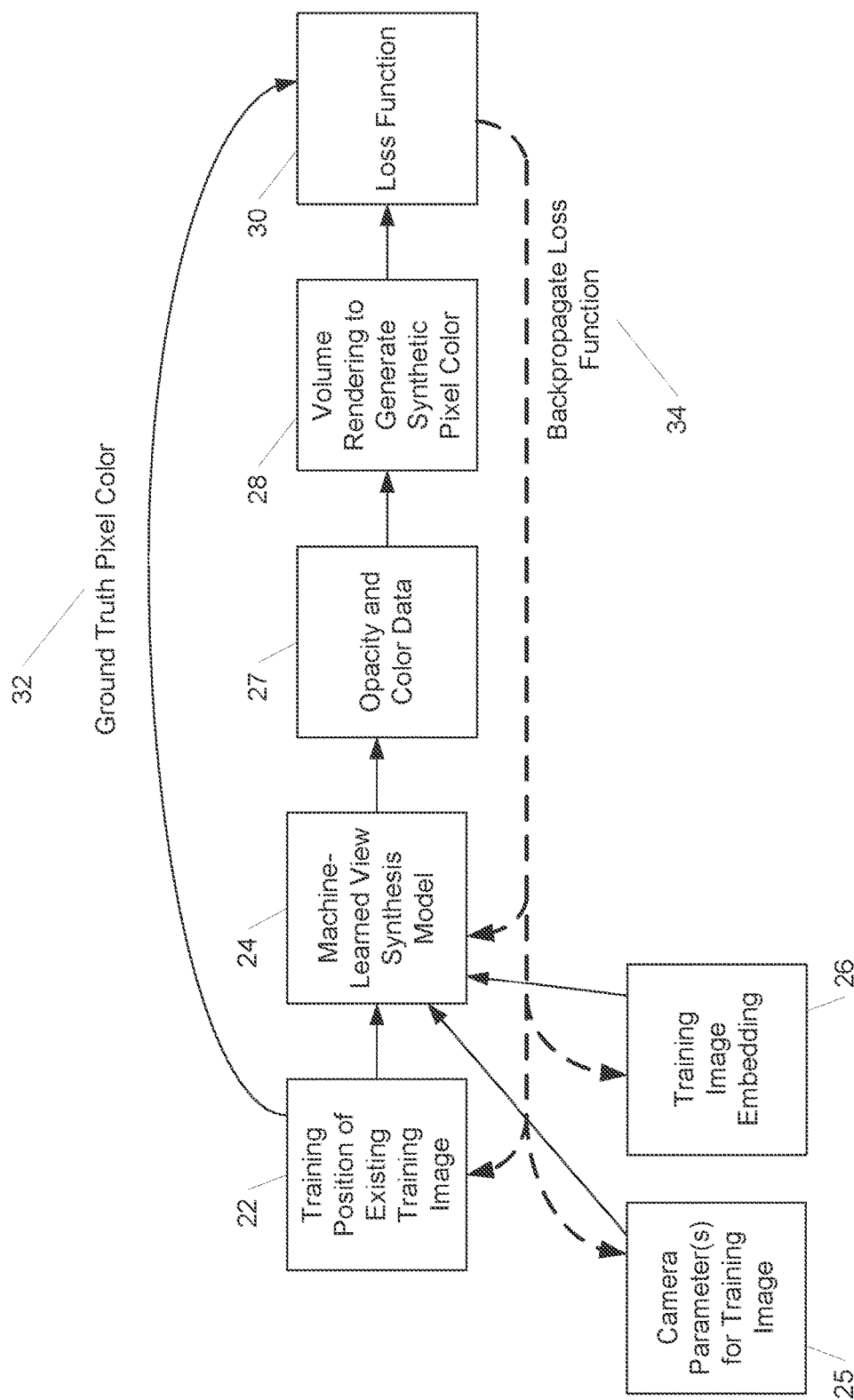
FIG. 2 depicts a block diagram of an example process to train a machine-learned view synthesis model according to example embodiments of the present disclosure.

FIG. 2 depicts a block diagram of an example process to train a machine-learned view synthesis model according to example embodiments of the present disclosure. In some implementations, the process shown in FIG. 2 can be performed for each pixel of each training image.

Referring to FIG. 2, a training position 22 of an existing training image can be provided to the machine-learned view synthesis model 24. The position 22 can include a location and orientation of the camera that took the training image. In addition, according to an aspect of the present disclosure, in some implementations, one or more camera parameters 25 for the training image and/or a training image embedding 26 for the training image can be provided to the machine-learned view synthesis model 24. As examples, the additional camera parameters 25 can include focal length, principal point, skew, radial distortion, tangential distortion, and/or various camera intrinsics. The training image embedding 26 can be a generative embedding that has been assigned to the training image.

In particular, core to the challenges presented by "in-the-wild" imagery is the concept of per-image color variation: while it is assumed that the 3-D geometry of a scene is identical between all images, less consistency is expected from color due to variations in lighting and camera settings such as exposure.

To resolve this issue, in some implementations, each image in the training set can be assigned a unique embedding $e_i^{(g)}$ 26. These embeddings $\{e_i^{(g)}\}_{i=1}^N$ can be optimized over the course of training along with the model's parameters.

Referring still to FIG. 2, the machine-learned view synthesis model 24 can process the inputted data to generate opacity and color data 27. For example, in some implementations, the machine-learned view synthesis model 24 can generate only a single set of opacity and color data 27 or, in other implementations, can generate both a static set of opacity and color data for static content of the scene and a transient set of color and opacity data 27 for transient content of the scene.

As one example, differential opacity σ(r) and color c(r, d) 27 can be predicted by a multilayer perceptron (MLP) or other model (e.g., some other form of neural network or other machine-learned model) given a 3-D location r(t) and view direction d. This MLP or other model can be explicitly designed to ensure that view direction d does not affect differential opacity a. For example, a base portion of the model can predict opacity from the location only while the color can be predicted from both the location and viewing angle/direction. Again, in some implementations, this MLP's inputs can be augmented with embedding $e^{(g)}$.

$$(c,\sigma)=MLP(r(t),d,e^{(g)})$$

where $e^{(g)}$ is the generative embedding corresponding to the image being rendered. Similar to view direction d, some example implementations can ensure that the generative embedding $e^{(g)}$ does not affect differential opacity σ. By augmenting the MLP's input with embedding $e_i^{(g)}$, the proposed models are able to directly vary the color and lighting of a scene based on an image's identity without modifying its 3-D geometry.

At 28, a volume rendering technique can be performed to generate a synthetic pixel color from the opacity and color data 27. For example, for a single set of opacity and color data 27, the color of a synthetic pixel can be obtained by integrating along a ray emanating from the camera:

$$C(r)=\int_{t_n}^{t_f}T(t)\sigma(r(t))c(r(t),d)dt \text{ where}$$
$$T(t)=-\int_{t_n}^{t}\sigma(r(s))ds \quad (1)$$

Figure 4:
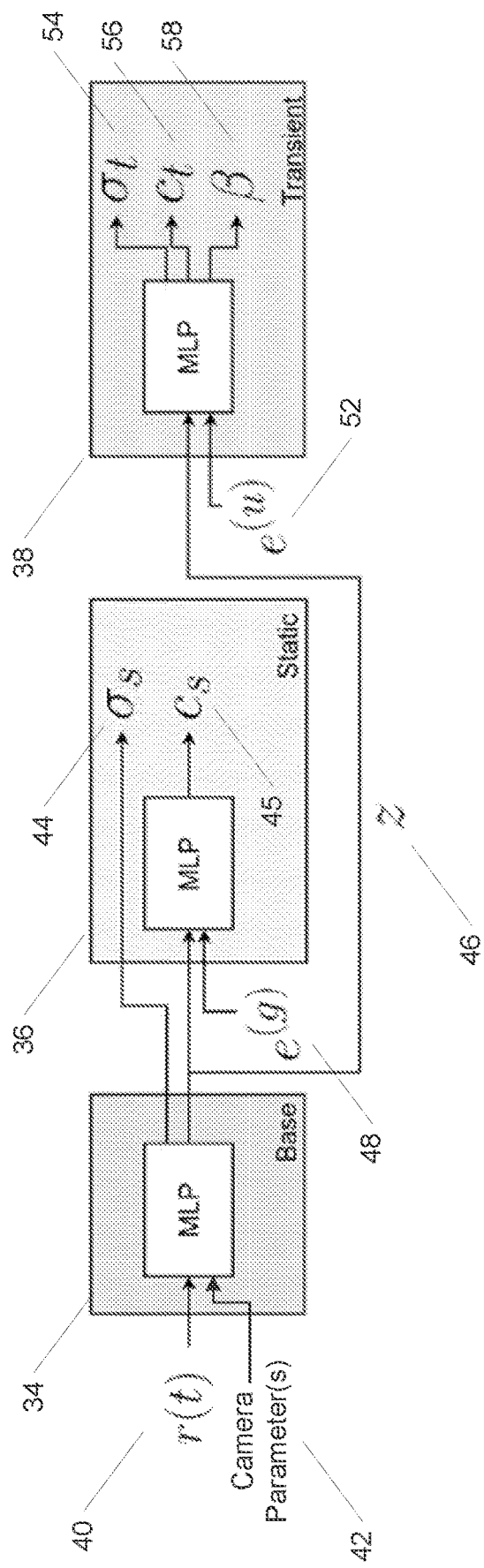
FIG. 4 depicts a block diagram of an example machine-learned view synthesis model according to example embodiments of the present disclosure.

According to another example aspect, while GLO is capable of capturing variable lighting and post-processing, it is unable to model variations in 3-D geometry. Thus, some implementations of the present disclosure feature a double-headed model that includes both a static portion that models static content and a transient portion that models transient content. Unlike implementations which produce a single tuple (σ, c) for a position in 3-D space, the proposed model with both static and transient heads produces two: one for 'static' objects common to all images ($\sigma_s$, $c_s$), another for 'transient' objects specific to a particular image ($\sigma_t$, $c_t$). These quantities can combined with a modified version of the volumetric rendering equation presented in Equation 1 Further, the proposed model outputs an uncertainty estimate β used to modulate each pixel's loss function. FIG. 4 provides a diagram of the proposed model architecture.

Specifically, referring now to FIG. 4, a block diagram of an example machine-learned view synthesis model according to example embodiments of the present disclosure is provided. The model can include a base portion 34, a static portion 36, and a transient portion 38.

Given a 3-D point r(t) 34, GLO embedding $e^{(g)}$ 48, and uncertainty embedding $e^{(u)}$ 52, the model shown in FIG. 4 produces differential opacities $\sigma_s$, $\sigma_t$ 44,54, colors $c_s$, $c_t$ 45, 56, and differential uncertainty β 58. Position embedding, view direction, and non-linearities are omitted for clarity. As described, additional camera parameters 42 may optionally be provided as well.

In some implementations, the base portion 34 of the example proposed model includes an MLP applied to 3-D position r(t) 40. Other models may be used as well. This MLP outputs differential opacity $\sigma_s$ 44 and a latent representation z 46. The latter is employed in two ways. First, the static portion 36 (e.g., which may include a 4-layer MLP or other model) to z 46 and viewing direction d to produce colors $c_s$ 45 similar to NeRF's MLP. Second, the transient portion 38 (e.g., which may include a second 4-layer MLP or other model) to z 46 augmented with a per-image embedding $e^{(u)}$ 52 to produce three quantities: transient differential opacity $\sigma_t$ 54, transient color $c_t$ 56, and an uncertainty value $\beta$ 58 described below. In some implementations, $\ell_1$ regularization can be applied to $\sigma_t$ to encourage sparsity.

Referring to FIG. 2 and FIG. 4 together, to produce at 28 the color for a single pixel from both the static and transient data 27, the following variation of the volumetric rendering equation can be used:

$$C(r) = \int_{t_n}^{t_f} T(t)(\sigma_s(r(t))c_s(r(t),d) + \sigma_t(r(s),e^{(u)})c_t(r(t),e^{(u)}))dt \qquad (2)$$

where $T(t) = -\int_{t_n}^{t}(\sigma_s(r(s)) + \sigma_t(r(s),e^{(u)}))ds$.

Note that color c in Equation 1 is replaced with a linear combination of $\sigma_s c_s + \sigma_t c_t$ and accumulated opacity a is replaced by the sum of $\sigma_s + \sigma_t$.

In some implementations such as the example shown in FIG. 4, the model is permitted to emit an uncertainty estimate $\beta$ 58. At training time, the accumulated opacity equation can be used to obtain the uncertainty for the corresponding predicted color C(r):

$$\beta(r) = \int_{t_n}^{t_f} \overline{\beta}(r(t))dt$$

As on example, the loss for a single pixel with ground truth color y can then be given by:

$$\ell(C(r), y, \beta(r)) = \frac{1}{2}\left(\frac{\|y - C(r)\|_2^2}{(\beta(r) + \beta_{min})^2} + \log(\beta(r) + \beta_{min})^2\right)$$

Intuitively, larger values of $\beta$ allow the model to downweight outliers—typically transient or moving objects such as people, grass, or clouds. The log term prevents from growing unboundedly and can be directly derived from the likelihood of a normal distribution. In some implementations, a hyperparameter $\beta_{min} \geq 0$ can be used to prevent the model from concentrating the majority of the loss on a small number of pixels.

More generally, referring again to FIG. 2, a loss function 30 can evaluate a difference between the synthetic pixel color generated at 28 and the ground truth pixel color 32 of the existing training image. For example, a squared error between the pixel colors expressed in RGB or some other color scheme can be used.

The loss function 30 can be backpropagated to train the machine-learned view synthesis model 24. In addition, in some implementations, the training image embedding 26, the training position 22, and/or the camera parameters 25 can be updated as well based on the loss function 30 (e.g., by continuing to backpropagate the loss through and past the model 24).

At test time, the model 24 can be used to render the static geometry common to all photos in the training set. In some implementations, images can be rendered by omitting $\sigma_t$, $c_t$, and $\beta$ entirely.

Figure 3:
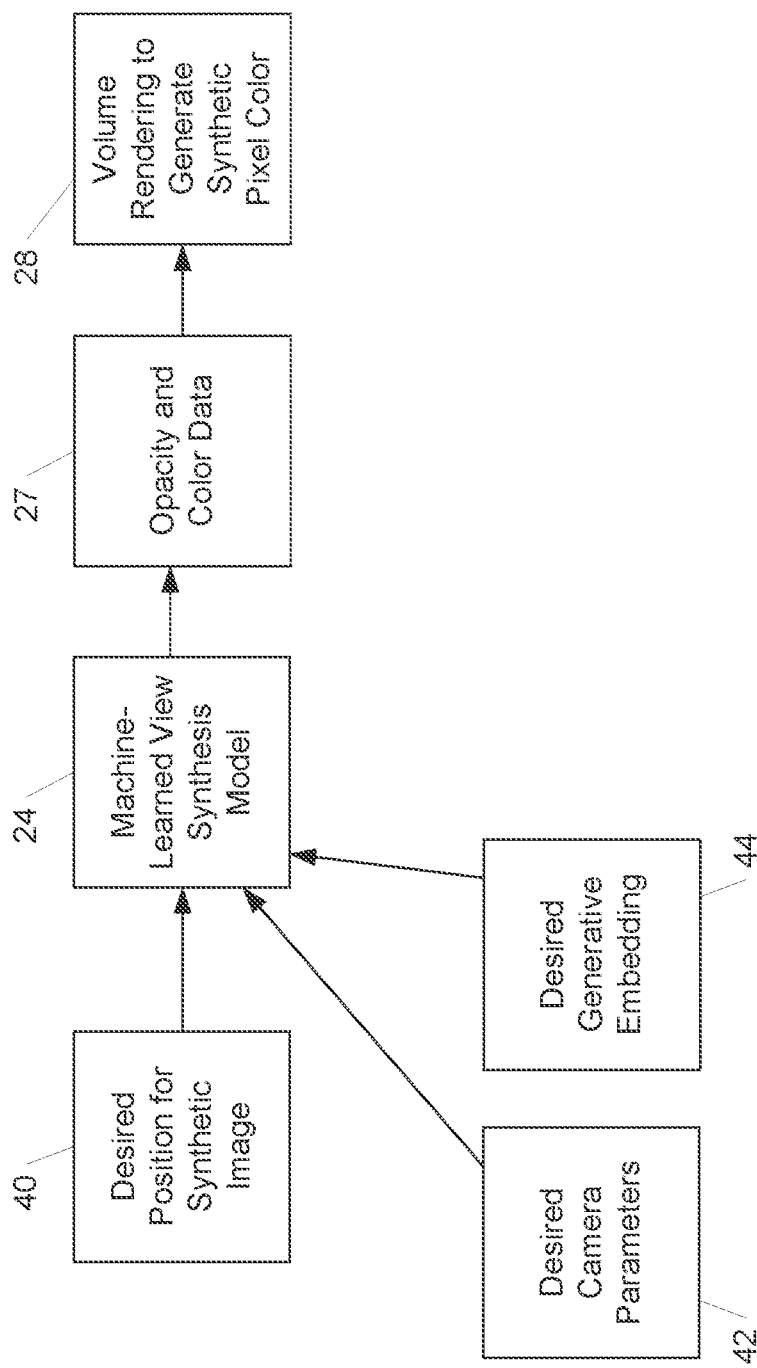
FIG. 3 depicts a block diagram of an example process to use a machine-learned view synthesis model according to example embodiments of the present disclosure.

As one example, FIG. 3 shows an example use of the machine-learned view synthesis model after training. Specifically, a desired position 40 (e.g., location and orientation) for a synthetic image of the scene is provided. Optionally, desired camera parameters 42 and/or a desired generative embedding 44 can be provided as well.

The machine-learned view synthesis model 24 can process the inputs to generate opacity and color data 27 (e.g., single set of opacity and color data or both static and transient opacity and color data, or just static opacity and color data). Volume rendering 28 can be performed on the opacity and color data (e.g., only the static data) to generate a synthetic pixel color for the pixel of the synthetic image.

The process shown in FIG. 3 can be performed for each pixel of the synthetic image.

Example Devices and Systems

Figure 5A:
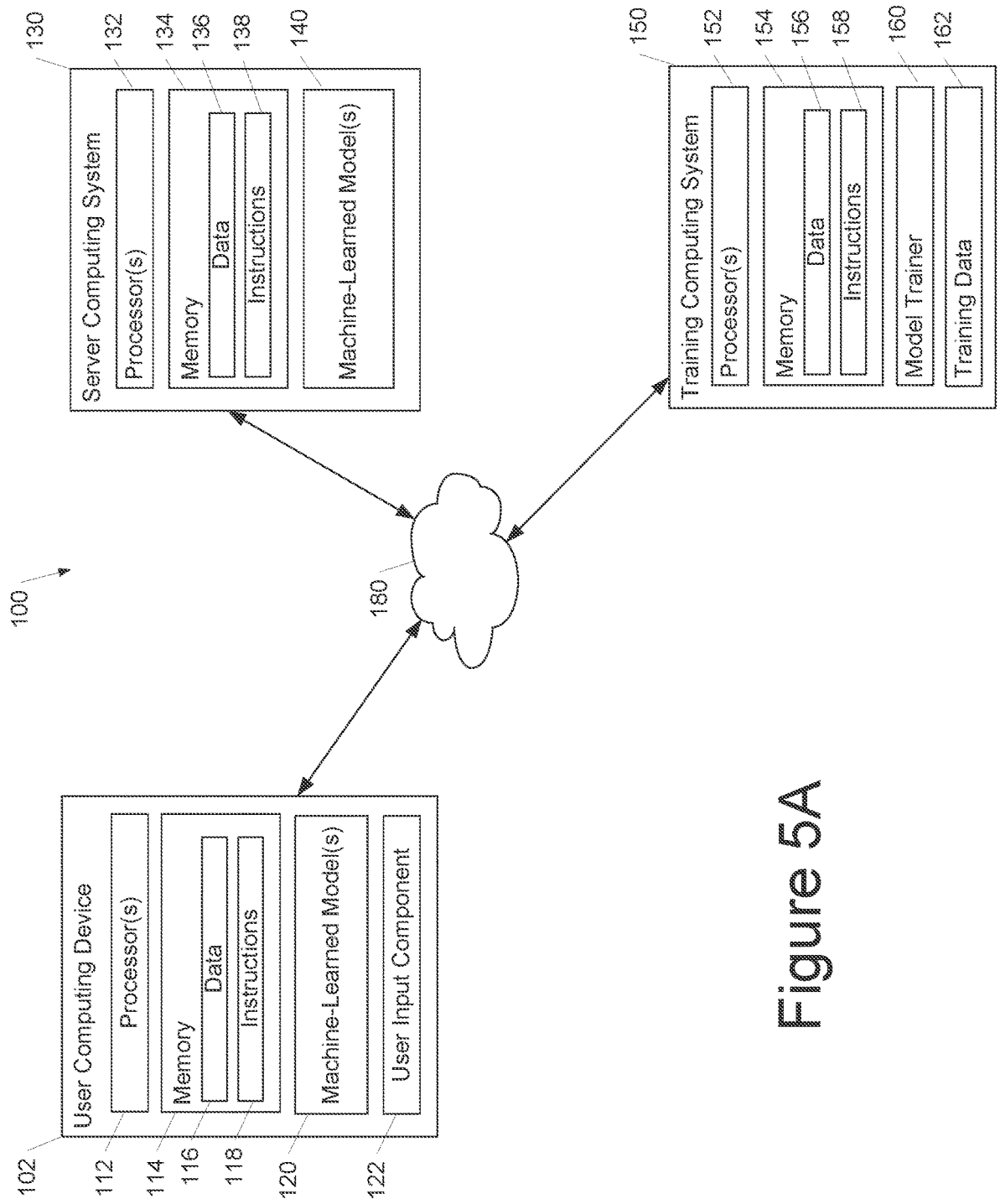
FIG. 5A depicts a block diagram of an example computing system according to example embodiments of the present disclosure.

FIG. 5A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1-4.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel view synthesis across multiple instances of the same or different scenes).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a view synthesis service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, unconstrained image data such as "in the wild" photographs.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 5B:
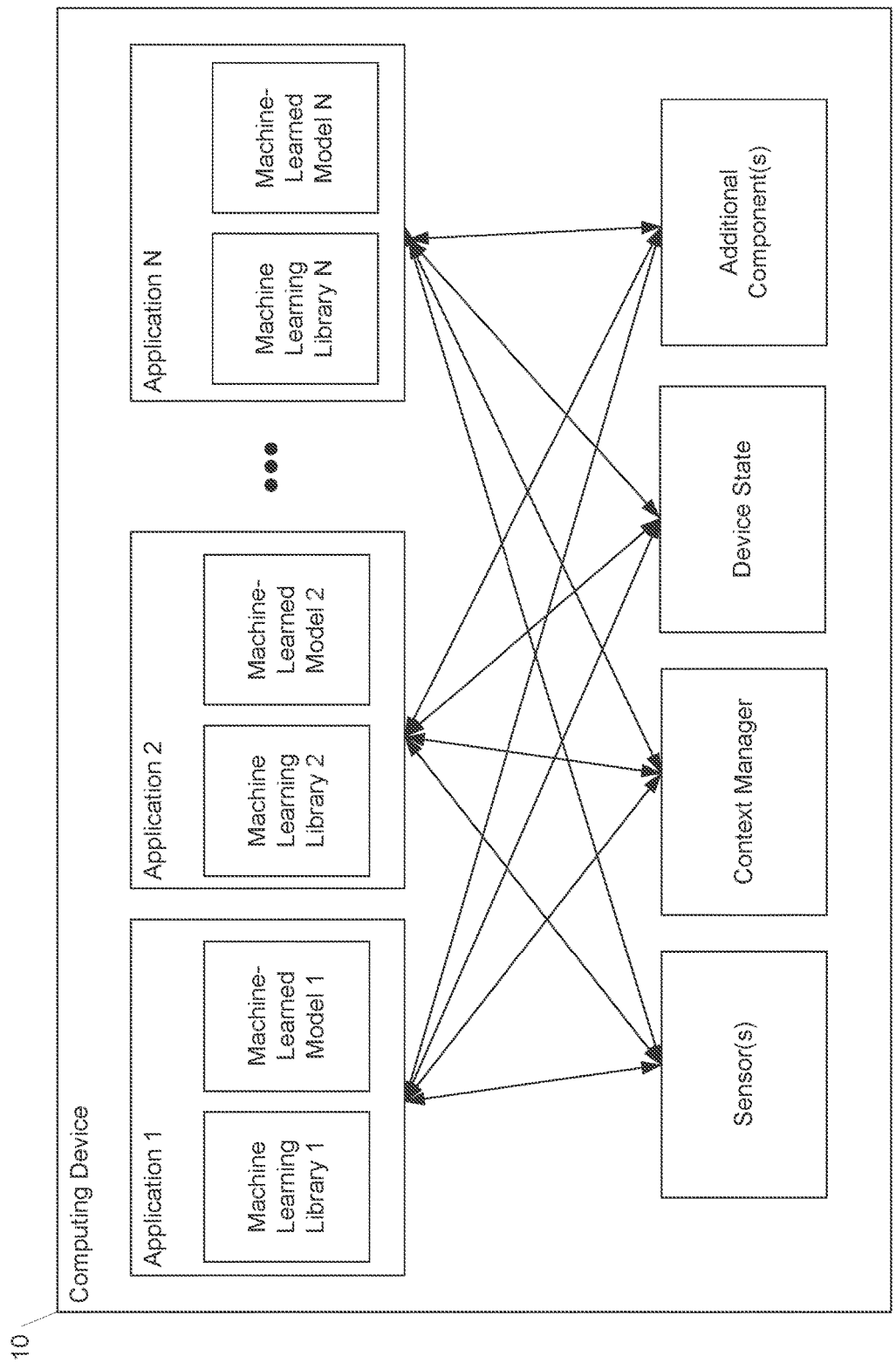
FIG. 5B depicts a block diagram of an example computing device according to example embodiments of the present disclosure.

FIG. 5B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
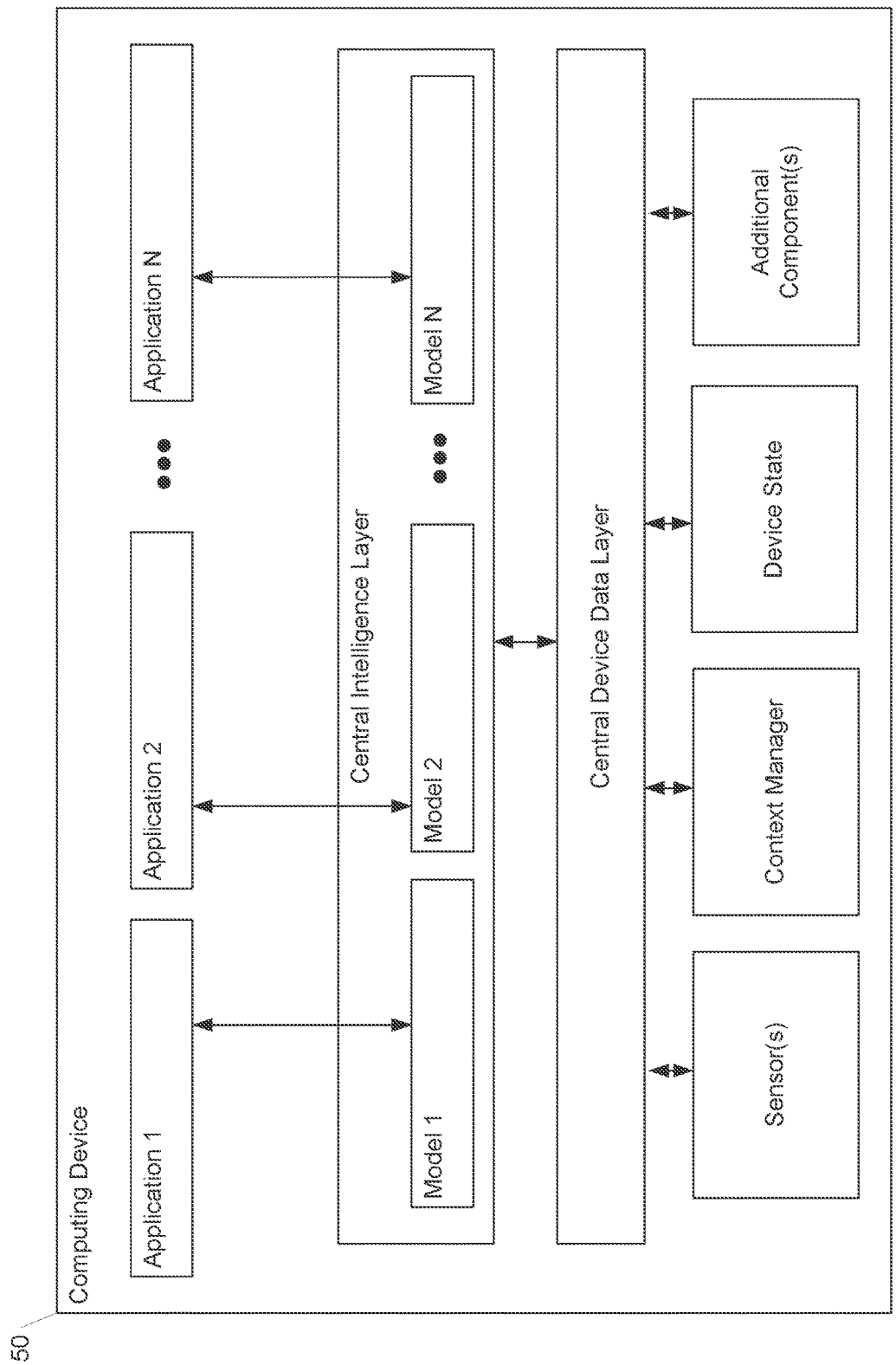
FIG. 5C depicts a block diagram of an example computing device according to example embodiments of the present disclosure.

FIG. 5C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system to generate synthetic imagery of a scene, the computing system comprising:
   one or more processors; and
   one or more non-transitory computer-readable media that collectively store:
      a machine-learned view synthesis model; and
      instructions that, when executed by the one or more processors, cause the computing system to perform operations, the operations comprising:
         accessing an existing training image that is associated with the scene, wherein the existing training image encodes a ground truth pixel color for a training pixel;
         generating a static color based on descriptive data and the machine-learned view synthesis model, wherein the descriptive data is descriptive of a position within three-dimensional space that is associated with the scene;
         generating a transient color based on the descriptive data and the machine-learned view synthesis model;
         generating a synthetic pixel color for a synthetic pixel of a synthetized image that depicts the scene, wherein the synthetic pixel color is generated based on the static color, the transient color, and the machine-learned view synthesis model;
         evaluating a loss function that compares the synthetic pixel color with a ground truth pixel color; and
         training the machine-learned view synthesis model based on the loss function.

2. The computing system of claim 1, wherein training the machine-learned view synthesis model includes modifying one or more parameter values for one or more parameters of the machine-learned view synthesis model based at least in part on the loss function.

3. The computing system of claim 1, wherein generating the synthetic pixel color is further based on a static opacity and a transient opacity.

4. The computing system of claim 1, wherein the operations further comprise:
   generating a latent representation based on the descriptive data and the machine-learned view synthesis model;
   generating the static color further based on the latent representation; and
   generating the transient color further based on the latent representation.

5. The computing system of claim 1, wherein the operations further comprise:
   generating a static opacity based on the descriptive data and the machine-learned view synthesis model;
   generating a transient opacity based on a latent representation and the machine-learned view synthesis model, wherein the latent representation is generated based on the descriptive data and the machine-learned view synthesis model; and performing volumetric rendering to generate the synthetic color, and wherein generating the synthetic color is further based on the static opacity and the transient opacity.

6. The computing system of claim 5, wherein the machine-learned view synthesis model includes a base portion and the operations further comprise:
generating the latent representation based on the base portion of the machine-learned view synthesis model processing the descriptive data; and
generating the static opacity based on the base portion of the machine-learned view synthesis model processing the descriptive data.

7. The computing system of claim 5, wherein the machine-learned view synthesis model includes a static content portion that models static content within the scene and the operations further comprise:
generating the static color further based on that static portion of the machine-learned view synthesis models processing the latent representation.

8. The computing system of claim 5, wherein the machine-learned view synthesis model includes a transient content portion that models transient content within the scene and the operations further comprise:
generating the transient opacity further based on the transient content portion of the machine-learned view synthesis model processing the latent representation; and
generating the transient color further based on the transient content portion of the machine-learned view synthesis model processing the latent representation.

9. The computing system of claim 8, wherein:
said processing the latent representation with the transient content portion of the machine-learned view synthesis model further generates an uncertainty value; and
the loss function includes a pixel loss term that effects a negative correlation between loss magnitude and the uncertainty value.

10. The computing system of claim 8, wherein the operations further comprise:
inputting an uncertainty embedding into the transient content portion of the machine-learned view synthesis model alongside the latent representation to generate the transient opacity and the transient color.

11. The computing system of claim 7, wherein the operations further comprise:
inputting a generative embedding into the static content portion of the machine-learned view synthesis model alongside the latent representation to generate the static color.

12. The computing system of claim 11, wherein the generative embedding is associated with the existing training image, and the operations further comprise:
modifying one or more values of the generative embedding based at least in part on the loss function.

13. The computing system of claim 1, wherein the operations further comprise:
inputting one or more camera parameters into the base portion of the machine-learned view synthesis model alongside the position to generate the static opacity and the latent representation; and
modifying one or more of the camera parameters based at least in part on the loss function.

14. The computing system of claim 1, wherein the computing system performs each of the operations for each respective pixel in the synthetic image.

15. The computing system of claim 1, wherein the position comprises a location and an orientation.

16. The computing system of claim 1, wherein the position comprises a new position that is not included in a training set that includes the existing training image.

17. The computing system of claim 1, wherein the machine-learned view synthesis model comprises a respective multi-layer perceptron.

18. The computing system of claim 1, wherein the position within three-dimensional space comprises a capture position associated with an existing training image and the operations further comprise:
obtaining the position within the three-dimensional space.

19. A computer-implemented method comprising:
accessing an existing training image that is associated with a scene, wherein the existing training image encodes a ground truth pixel color for a training pixel;
generating a static color based on descriptive data and the machine-learned view synthesis model, wherein the descriptive data is descriptive of a position within three-dimensional space that is associated with the scene;
generating a transient color based on the descriptive data and the machine-learned view synthesis model;
generating a synthetic pixel color for a synthetic pixel of a synthetized image that depicts the scene, wherein the synthetic pixel color is generated based on the static color, the transient color, and the machine-learned view synthesis model;
evaluating a loss function that compares the synthetic pixel color with a ground truth pixel color; and
training the machine-learned view synthesis model based on the loss function.

20. A computer-implemented method comprising:
obtaining a position within three-dimensional space that is associated with a scene;
generating a static color based on descriptive data and a machine-learned view synthesis model, wherein the descriptive data is descriptive of the position within three-dimensional space;
generating a transient color based on the descriptive data and the machine-learned view synthesis model;
performing volumetric rendering to generate to generate a synthetic pixel color for a synthetic pixel of a synthetized image, wherein the synthetic pixel color is generated based on the static color, the transient color, and the machine-learned view synthesis model.

* * * * *